United States Patent [19]

Tani et al.

[11] Patent Number: 5,237,560
[45] Date of Patent: Aug. 17, 1993

[54] OPTICAL DISC CARTRIDGE

[75] Inventors: Toyofumi Tani; Hiroo Shimegi, both of Amagasaki, Japan

[73] Assignee: Mitsubishi Denki Kabushiki Kaisha, Japan

[21] Appl. No.: 366,138

[22] Filed: Jun. 14, 1989

[30] Foreign Application Priority Data

Jun. 23, 1988 [JP] Japan .................. 63-155228
Jul. 4, 1988 [JP] Japan ................ 63-88945[U]
Jul. 7, 1988 [JP] Japan ................ 63-90272[U]

[51] Int. Cl.⁵ .............................. G11B 23/03
[52] U.S. Cl. ................... 369/291; 369/77.2; 360/133
[58] Field of Search ............ 369/272, 273–274, 369/277, 279, 280, 289–291; 360/131–133, 137

[56] References Cited

U.S. PATENT DOCUMENTS

| | | | |
|---|---|---|---|
| 4,680,662 | 7/1987 | Fukushima et al. | 369/291 X |
| 4,736,357 | 4/1988 | Uehara et al. | 369/77.2 X |
| 4,847,826 | 7/1989 | Sakaguchi et al. | 369/291 X |
| 4,858,050 | 8/1989 | Ashe et al. | 369/291 X |
| 4,899,238 | 2/1990 | Inoue et al. | 369/77.2 X |
| 4,908,726 | 3/1990 | Kato | 369/291 X |
| 4,918,559 | 4/1990 | Maruyama et al. | 369/291 X |
| 4,926,411 | 5/1990 | Ouwerkerk et al. | 369/291 |
| 4,945,530 | 7/1990 | Sandell et al. | 369/77.2 X |
| 4,972,404 | 11/1990 | Yamaguchi et al. | 369/291 X |

FOREIGN PATENT DOCUMENTS 61-39280  2/1986  Japan .
61-206983 9/1986  Japan .
62-245191 10/1987 Japan .

Primary Examiner—William M. Shoop, Jr.
Assistant Examiner—David Martin
Attorney, Agent, or Firm—Wolf, Greenfield, & Sacks

[57] ABSTRACT

The present invention discloses an optical disc cartridge housing therein a magneto optical disc, wherein, a second opening for a magnetic head of the case to access is formed joining with a notch formed at an end surface of the case, and also a notch coordinating with the second opening is formed at a shutter when the shutter is at a position for opening. Thereby, it is unnecessary for the magnetic head to rise and fall in such a case where the optical disc cartridge is inserted into the optical disc driving unit, and the magnetic head accesses the magneto optical disc.

9 Claims, 10 Drawing Sheets

OPTICAL DISC CARTRIDGE

BACKGROUND OF THE INVENTION

1. Field of the Invention

The present invention relates to an optical disc cartridge, particularly, to improvements of openings for magnetic head and of a shutter.

2. Description of the Prior Art

FIG. 1 is a perspective view showing a construction of a conventional optical disc cartridge, and FIG. 2 is a sectional view of the above cut off through II—II line shown in FIG. 1. In FIG. 1, reference numeral 1 indicates a plastic case of an optical disc cartridge wherein a magneto optical disc 3 is housed. The case 1 is shaped like a flat board being hollow inside with a thickness of several mm, comprised of two flat members, that is, upper case 15 and lower case 16. At the lower case 16, a first opening including a rectangular hole 6 and a center hole 8 is formed. The first opening 4 is for an optical head (not shown) to access, and the width and length thereof are those which are enough for the optical head to access the magneto optical disc 3. Also, at the upper case 15, a second opening 5 of the same shape as that of the first opening is formed. The second opening 5 is for a magnetic head 10 to access, and the width and length thereof are those which are enough for the magnetic head 10 set up on an arm 9 shown in FIG. 2 to access the magneto optical disc 3. And, the upper case 15 has a thickness of $l_1$.

A shutter 2 of stainless steel thin board, which closes both the openings 4 and 5 of the case 1 when an optical disc cartridge is taken out of the disc driving unit, is set up at one end of the case 1 so that it, having a section of U shape, has both faces of the case therebetween. The shutter 2 is installed so that it moved freely between a position for closing both openings 4 and 5 and a position for opening them. It is usually energized at the position for closing by means of a spring 11 (refer to FIG. 3). An aperture 7, facing the first opening 4 of the case 1 when the shutter 2 is at the position for opening and being the same shape as the first opening, is formed at the shutter 2, the magnetic head 10 accessing the magneto optical disc 3 therefrom. FIG. 3 through FIG. 6 show the case and the shutter in detail used in the case described above. FIG. 3 shows a plan view of the upper case 15 side of the optical disc cartridge, when the shutter 2 is at the position for closing. In the figure, reference numeral 11 is a spring which changes its shape by the movement of the shutter 2, and energizes the shutter 2 at the position for closing the opening 5. FIG. 4 shows a plan view of the lower case 16 side of the case 1. In the case of an optical disc cartridge, FIG. 4 shows the side of an optical head. In the figure, numeral 6 indicates a rectangular aperture used when an optical head (not shown) is inserted, and 8 indicates a circle aperture joining with the rectangular aperture, used for inserting a mount for fitting a magneto optical disc when the magneto optical disc is driven by a motor (not shown). These two apertures form a first opening 4. FIG. 5(a) is an enlarged view of the E portion in FIG. 4, and FIG. 5(b) is a plan view in the case where the FIG. 5(a) is taken as a front view and FIG. 5(c) is a sectional view when cut off through the K—K line shown in FIG. 5(b). In these figures, numeral 25 indicates an outside board of the lower case 16, and since a notch 16b is formed at an end side of the aperture 6 of the first opening 4, the outside board 25 is thinner by a predetermined length than the other part 24 of the lower case 16. This leads an optical head to smooth accessing. FIG. 6(a) is a plan view showing a conventional shutter, FIG. 6(b) is a left side view of the above, and FIG. 6(c) is a sectional view of the above cut off through the M—M line shown in FIG. 6(a). The under face 33 of the lower case 16 side of the shutter 2 is narrower in width in comparison with the top face 34 of the upper case 15 side, an aperture 7 of approximately the same shape as the second opening 5 of the upper case being formed at the top face 34. At the under face side of connecting portion 27 of the top face 34 with the under face 33, a notch 18 is formed having a width being the same as that of the aperture 7 and a depth corresponding to the notch 16b of the outside board 25 of the lower case 16.

Generally, a magnetic head is used for generating a biased magnetic field for overwriting. Since the magnitude of the magnetic field which is generated by a slider type magnetic head is small, it cannot be kept away from a recording medium as an optical head is. So, slider-type magnetic head 10 impresses a magnetic field in the state that it rises several through ten-odd $\mu m$ above a recording medium by means of dynamic pressure. (Fixed-type magnetic head is used in the state that it is kept about tens through 100 $\mu m$ apart from a recording medium.) Accordingly, in the conventional magneto optical disc, since the opening 5 is formed only on one side surface of the case, when an optical disc cartridge for a magneto optical disc is inserted into the disc driving unit, the magnetic head 10 needs to get over the end surface of the case 1, therefore causing a problem that the elevating mechanism has to be set up on an arm 9. This leads to a large-sized disc driving unit and complicated driving system of magnetic head.

Since the distance between the magnetic head 10 and the recording medium is very close, there is a problem that, in the case where the air inflowing from outside of the optical disc cartridge includes dust, the dust results in cutting off the air flow, thereby prohibiting the magnetic head 10 from rising and sometimes causing the magnetic head to fall down on the recording medium. Also, there is a problem that air flow is not stabilized on the surface of the recording medium which faces the magnetic head 10, since there is no air intake in the upper case 15.

SUMMARY OF THE INVENTION

The present invention has been devised to solve the problems of the aforesaid prior art and, therefore, it is a primary object of the present invention to provide an optical disc cartridge which can do without an elevating mechanism of a magnetic head by joining an opening for the magnetic head with a notch formed at one end surface thereof and by forming a notch at a shutter coordinating with the above notch.

It is another object of the present invention to provide an optical disc cartridge which controls the movement of a shutter and whose connecting part is strengthened by forming a groove at one end surface of the case and by forming a bending portion which engages with the above groove at a joining portion of the shutter having the case there-between.

It is a further object of the present invention to provide an optical disc cartridge which supplies clean air all over the surface of a magneto optical disc facing a magnetic head by providing an air intake with a filter at the surface of an optical disc cartridge facing the magnetic head.

The above and further objects and features of the invention will more fully be apparent from the following detailed description with accompanying drawings.

DESCRIPTION OF THE PREFERRED EMBODIMENTS

Hereinafter, a detailed description is made of the present invention in reference to drawings showing embodiments thereof.

Figure 7:
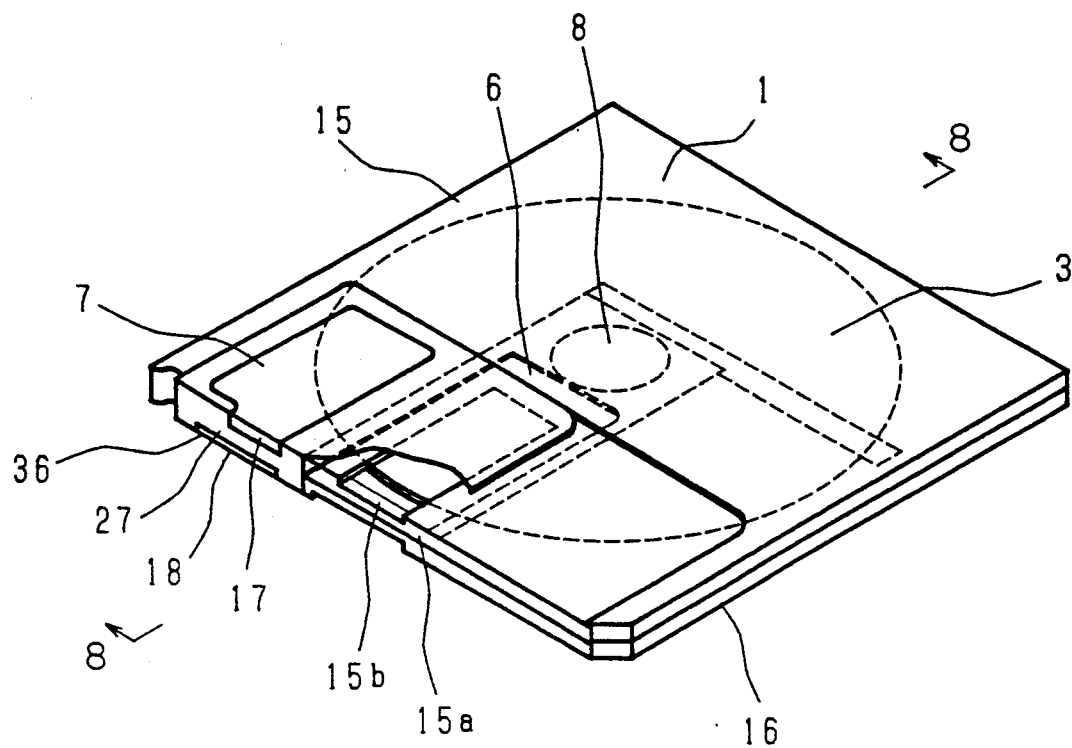
FIG. 7 is a perspective view of an optical disc cartridge of a first embodiment of the present invention.
Figure 8:
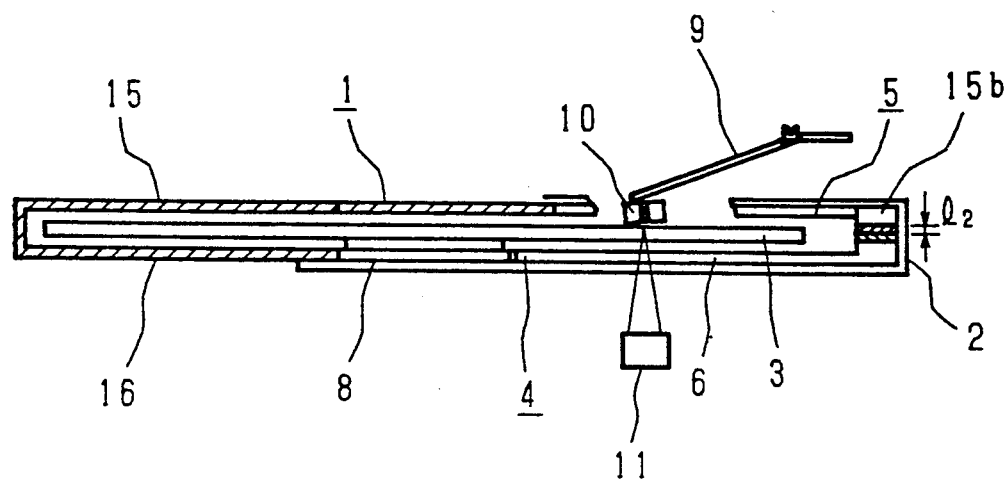
FIG. 8 is a cross-sectional view of the embodiment of the invention shown in FIG. 7.

FIG. 7 is a perspective view showing a construction of an optical disc cartridge of the present invention. FIG. 8 is a cross-sectional view of the embodiment of the invention shown in FIG. 7. In the figures, reference numeral 1 indicates a plastic case of an optical disc cartridge wherein a magneto optical disc 3 is housed. The case 1 is shaped like a flat board being hollow inside with a thickness of several mm, comprised of two flat members, that is, upper case 15 and lower case 16. At the lower case 16, a first opening 4 including a rectangular hole 6 and a center hole 8 is formed. The first opening 4 is for an optical head to access, and the width and length thereof are those which are enough for the optical head to access a magneto optical disc 3. Also, at the upper case 15, a second opening 5 for a magnetic head 10 is formed. The second opening 5 is joined with a notch 15b which is a cut-off portion of an end surface 15a of the upper case 15, being opened with a length which is enough for a magnetic head 10 to access the inmost track of the magneto optical disc 3. The width of the opening 5 is determined so that the slider-type magnetic head 10 which is set up on an arm 9 shown in FIG. 8 can access all the track of the magneto optical disc, at the position where the magnetic head 10 faces an optical head 18. Thickness $l_2$ of the case in the figure is thinner than that $l_1$ of the conventional case by the length cut off.

On the other hand, numeral 2 indicates a shutter, 17 indicates a notch at the upper case 15 side of the shutter; 2, 27 shows a bridge at the one end surface side of the case. The shutter 2 of stainless steel thin board, which closes both the openings of the case 1 when an optical disc cartridge is taken out of the disc driving unit, is set up at one end of the case 1 so that it, having a section of U shape, have both faces of the case therebetween. The shutter 2 is installed so that it moves freely between a position for closing both openings 4 and 5 and a position for opening them. It is usually energized at the position for closing by means of a spring (not shown). When the shutter 2 is at a position for opening, an aperture 7, facing the second opening 5 of the case 1, being wider in width and joining with a notch 17 engaging with a notch 15b of the upper case 15, is formed. Also, a notch 18, which faces a notch 16b of the lower case 16, is formed.

Figure 9:
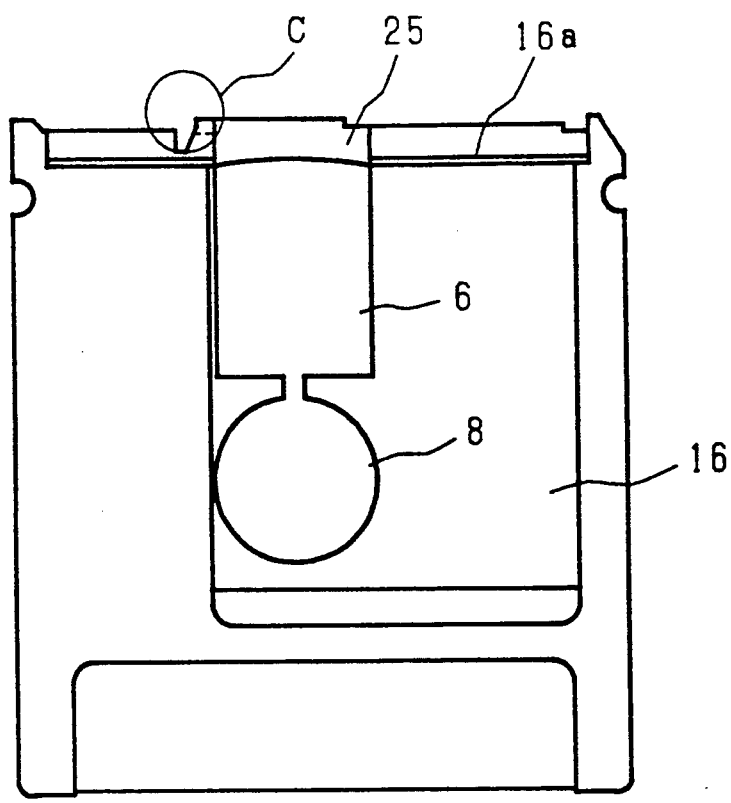
FIG. 9 is a plan view showing a first opening side board of a case.

FIG. 9 is a plan view of the lower case 16 side of the case 1. In the case of a magneto optical disc, FIG. 9 shows the side of an optical head. In the figure, reference numeral 6 indicates a rectangular aperture used when an optical head 11 is inserted, and 8 indicates a circle aperture joining with the rectangular aperture, used for inserting a mount for fitting a magneto optical disc when the magneto optical disc is driven by a motor (not shown). These two apertures form a first opening 4. And in the vicinity of an end portion of inserting side at the lower case 16, a guide groove 16a of the shutter 2 is formed.

Figure 10A:
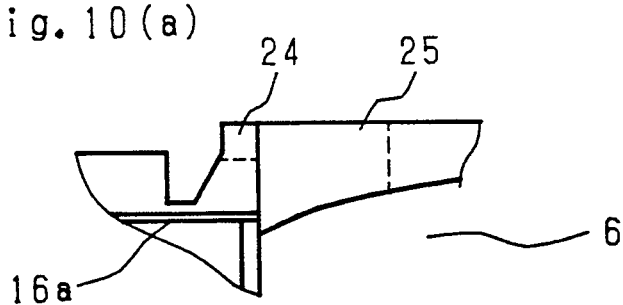
FIGS. 10a, 10b and 10c make up a partially enlarged view of FIG. 9.
Figure 10C:
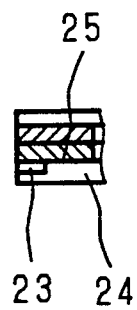
Figure 10B:
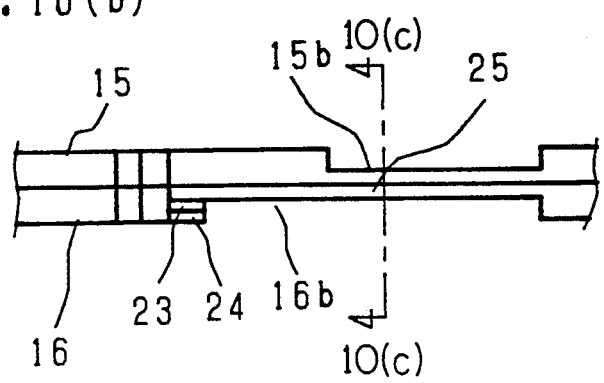

FIG. 10(a) is an enlarged view of the C portion of FIG. 9, FIG. 10(b) is a plan view in the case where the FIG. 10(a) is taken as a front view, and FIG. 10(c) is a sectional view when cut off through the G—G line in FIG. 10(b). In these figures, reference numeral 25 is an outside board of the lower case 16, and since a notch 16b is formed at an end side of the aperture 6 of the first opening 4, the outside board is thinner by a predetermined length than the other part 24 of the lower case 16. This leads an optical head to smooth accessing. Also, at an end surface of the lower case 16, a groove 23 flush with the notch 16b of the outside board 25 is formed, with which an under board 26 of the shutter 2 to be described later is engaged. And an end surface of the upper case 15, a notch 15b is formed, joining with the second opening 5. The width of the notch 15b is a little larger than the largest width of the magnetic head 10, therefore, it is not necessary for the magnetic head 10 to rise and fall to get over the end portion 15a of the upper case 15.

Figure 11A:
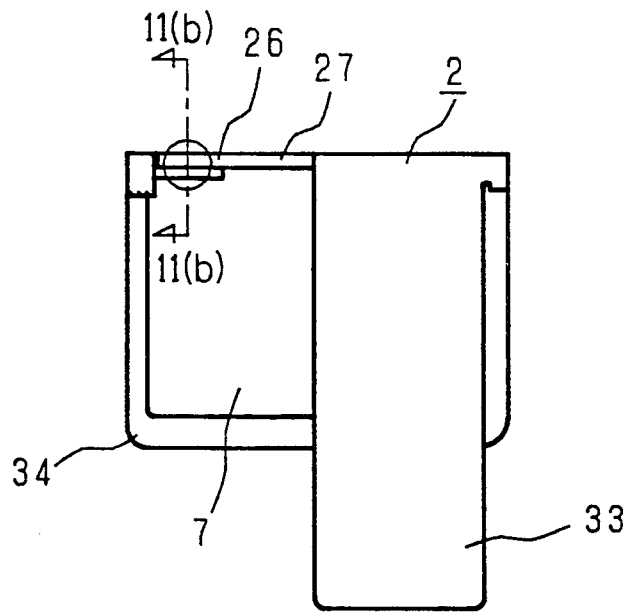
FIGS. 11a and 11b make up a plan view and a sectional view of a shutter of the present invention, FIGS. 12a, 12b, 12c, and 12d make up a plan view and a sectional view when viewed from the back side of FIG. 11, FIGS. 13a, 13b, and 13c are an explanatory view of configuration of a shutter of another embodiment of the present invention.
Figure 11B:
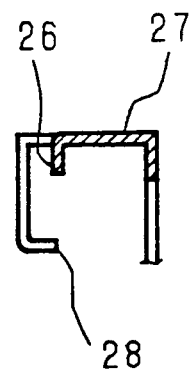
Figure 12A:
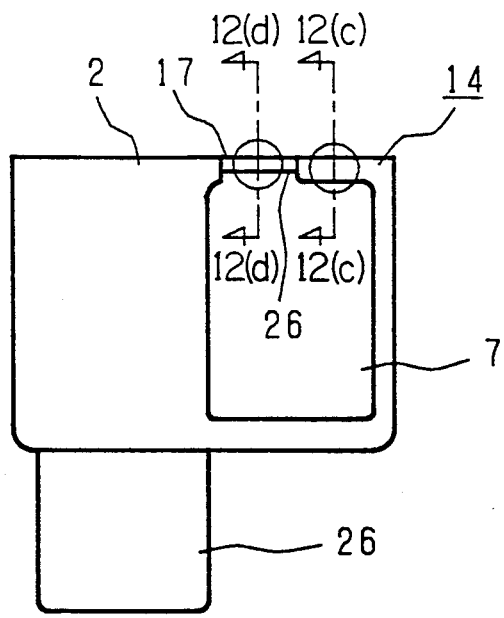
Figure 12C:
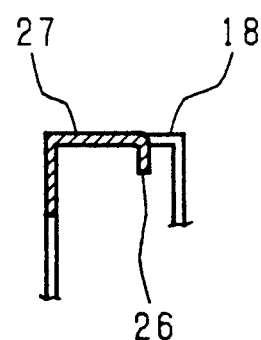
Figure 12B:
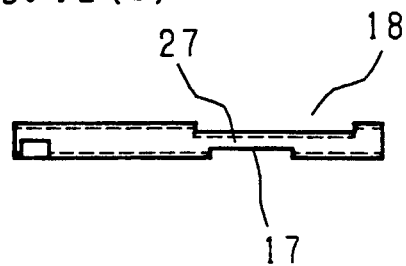
Figure 12D:
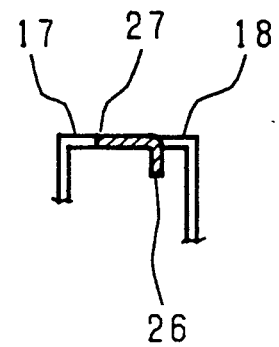

FIG. 11 and FIG. 12 are plan views showing a construction of a shutter. FIG. 11(a) is a plan view of the shutter viewed from the lower case side, FIG. 11(b) is a sectional view of the shutter cut off through A—A line in FIG. 11(a). FIG. 12(a) is a plan view of the shutter viewed from the upper case side, FIG. 12(b) is a front view of the shutter, and FIG. 12(c) and FIG. 12(d) are cross-sectional views of the shutter as seen through the F—F line and D—D line in FIG. 12(a). An under face 33 at the lower case 16 side of the shutter 2 is narrower in width when compared with a top face 34 of the upper case 15 side. At the top face 34, an aperture 7 of approximately the same shape as the second opening 5 of the upper case 15 is formed. At the under face side of a connecting portion 27 of the top face 34 with the under face 33, a notch 18 having a same width as the aperture 7 and a depth corresponding to the notch 16b of the outside board 25 of the lower case 16 is formed. At the edge of the connecting portion 27, the under board 26 which is bent into L-shape is formed and is to be engaged with the aforesaid groove 23. Also, at the top face 34 side of the connecting portion 27, a notch 17 of approximately the same width as that of the notch 15b joining with the second opening 5 is formed. Also, at both ends of the under face 33, a guide claw 28 which is bent into L-shape is formed. The claw 28 engages with the guide groove 16a to guide the movement of the shutter 2.

When an optical disc cartridge of the above construction is set in a disc driving unit (not shown), the shutter 2 is moved from a position for closing to a position for opening by means of a driving means provided in the disc driving unit, and the aperture 7 of the shutter 2 and the second opening 5 of the upper case 15 coordinate with each other. At that time, since the notch 15b and the notch 17 are formed at the end portion 15a of the upper case 15 and at the connecting portion 27 of the shutter 2, respectively, and the thickness of the end portion of the case 1 is thinner than the conventional one, the magnetic head 10 is arranged on the recording medium 3 without getting over the end surface of the case 1.

Figure 13A:
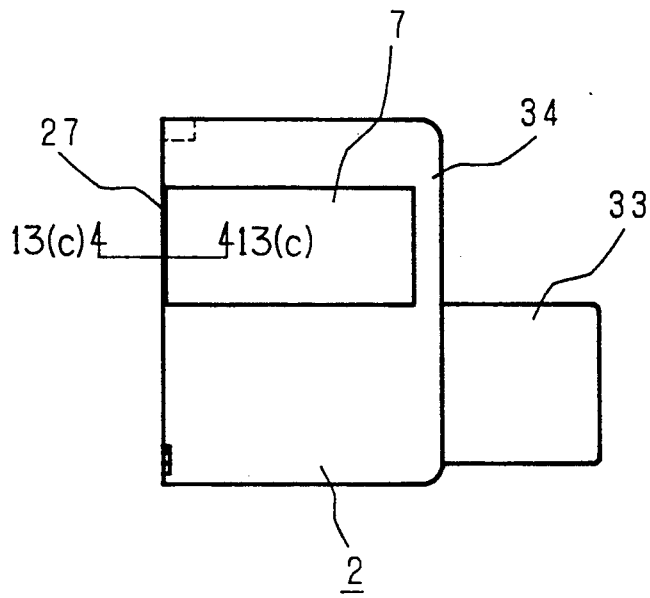
Figure 13B:
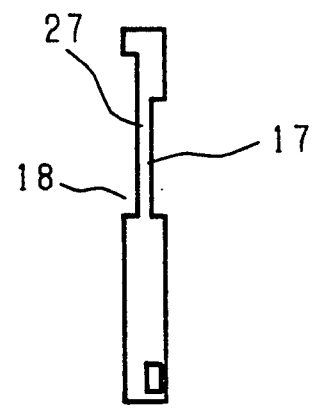
Figure 13C:
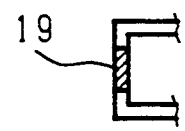

Next, explanation will be given of another embodiment of the invention. FIG. 13(a) is a plan view showing a construction of a shutter of an optical disc cartridge of another embodiment, FIG. 13(b) is a side view thereof, and FIG. 13(c) is a sectional view of the shutter cut off through the H—H line in FIG. 13(a). In this embodiment, unlike the aforesaid embodiment, an under board 26 which is bent is not formed, and a notch 17 has a same width with that of an aperture 7, thereby, simplifying manufacturing and reducing the cost. But the strength for bending lowers because the width of end face 27 is narrow and is not bent.

Figure 14:
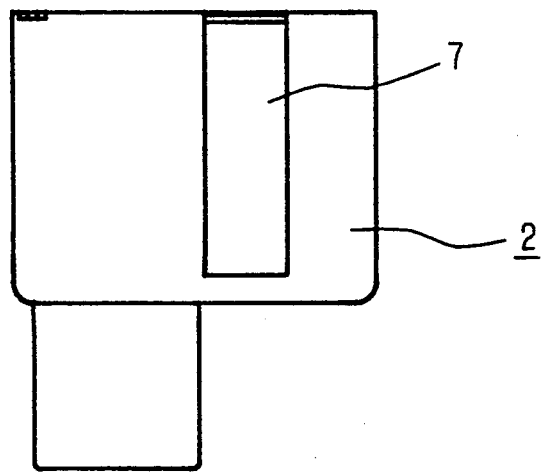
FIG. 14 is a construction view of still another embodiment of a shutter of the present invention.

From this point of view, the first embodiment shown in FIG. 11 and FIG. 12 has few problems conserning strength because it has a section of L-shape and C-shape. It is also capable of having a function for positional controlling by moving the shutter 2 with making the under board 26 go along with the groove 23. FIG. 14 is a drawing showing a further embodiment wherein the width of opening is reduced corresponding to the size of the magnetic head. Since thickness of the shutter is thin, being usually about 0.3 mm, the above method increases the strength. In the figure, reference numeral 7 is an aperture.

As mentioned above, the present invention has advantage. For example, there is no need for an arm which upholds a magnetic head to have a function for rise and fall. A disc driving unit can be small-sized and accessing time can be reduced, by forming an opening for accessing the magnetic head by cutting off an end of a case. At this time, a groove, which has been formed at the case, has also an effect for positional controlling of the movement of the shutter.

Figure 1:
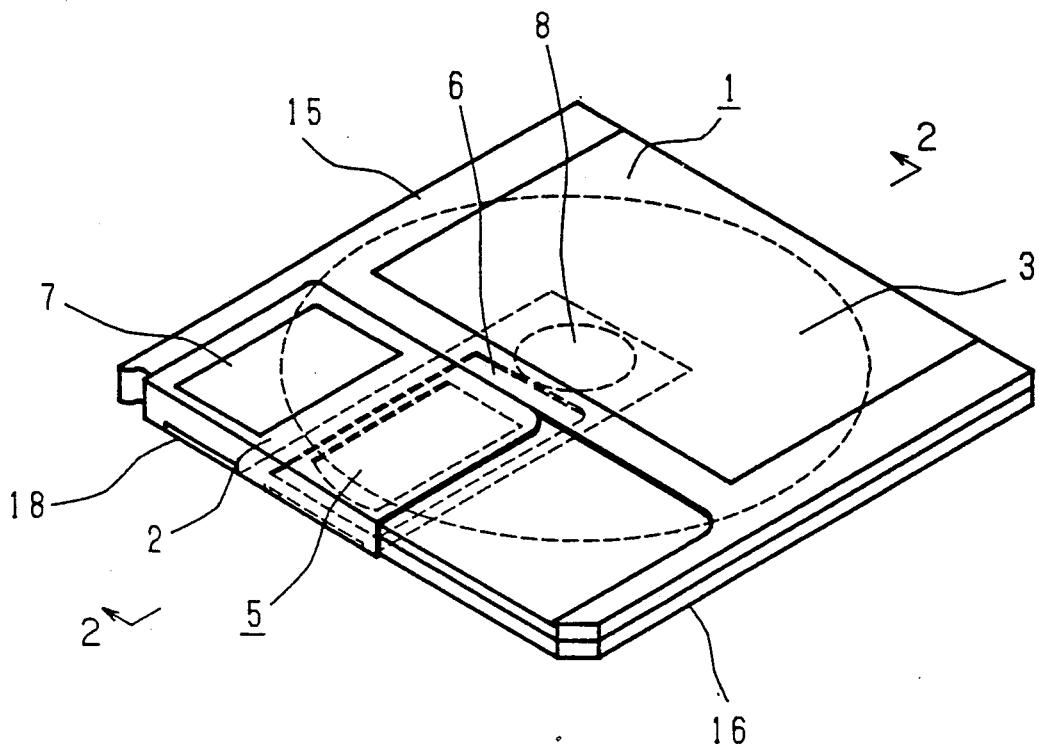
FIG. 1 is a perspective view of a conventional optical disc cartridge.
Figure 2:
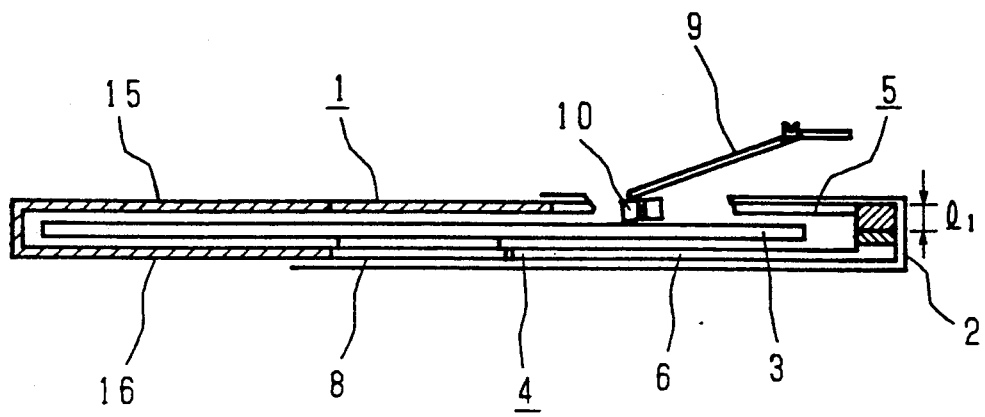
FIG. 2 is a sectional view of the above cut off through II—II line shown in FIG. 1.
Figure 3:
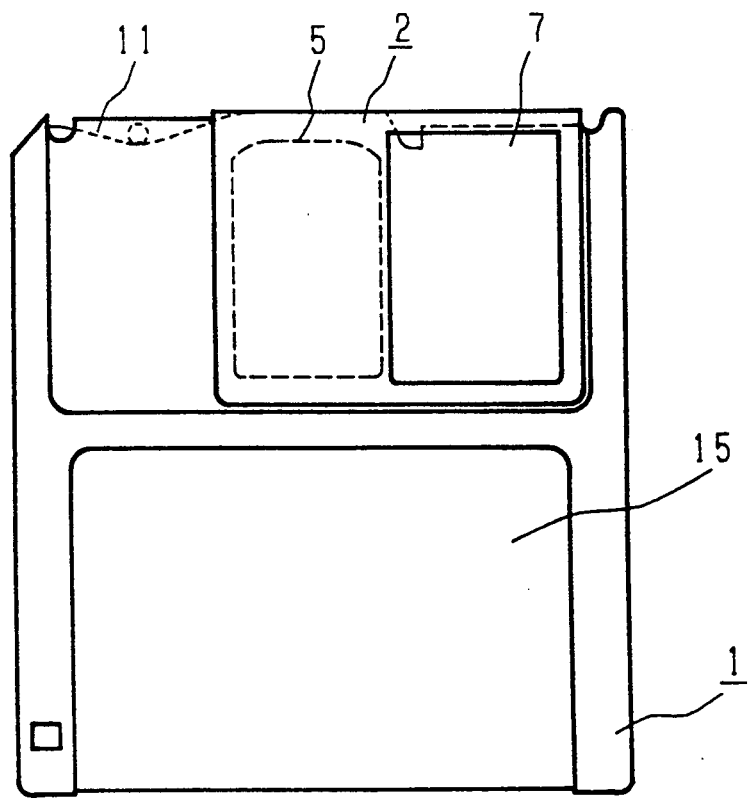
FIG. 3 is a plan view of a conventional case.
Figure 4:
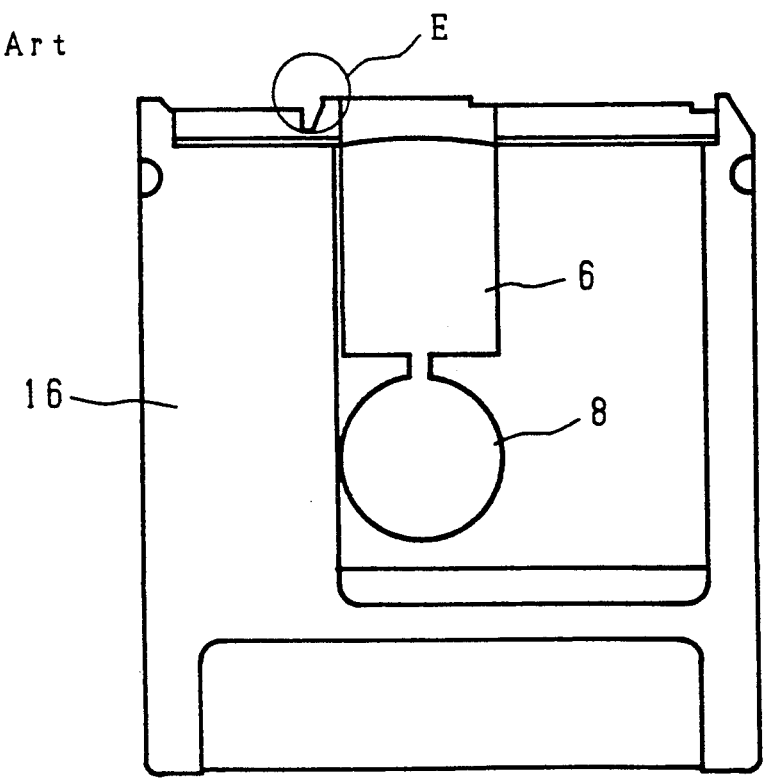
FIG. 4 is a plan view showing a first opening side board of a conventional case.
Figure 5A:
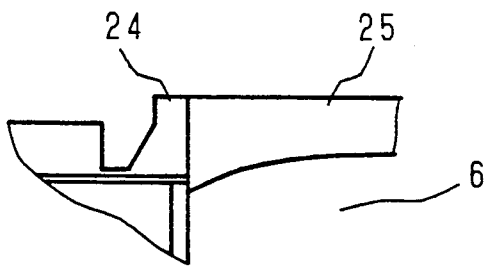
FIGS. 5a, 5b, and 5c are enlarged views of FIG. 4, FIGS. 6a, 6b, and 6c make up a plan view and a sectional view of a conventional shutter.
Figure 5B:
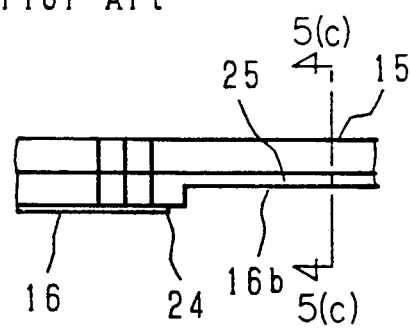
Figure 5C:
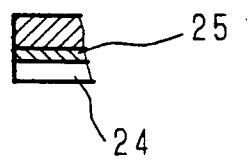
Figure 6A:
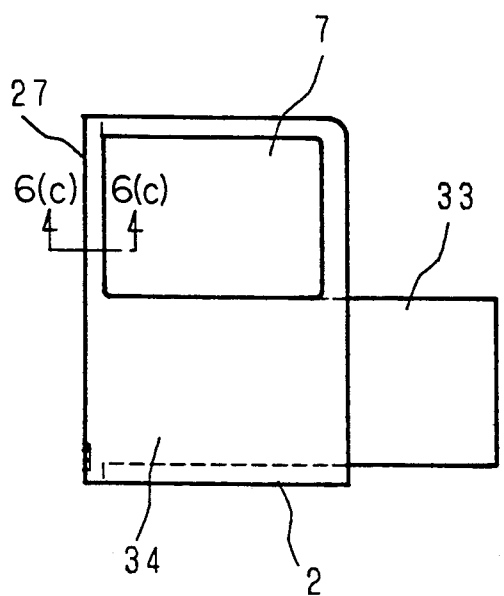
Figure 6B:
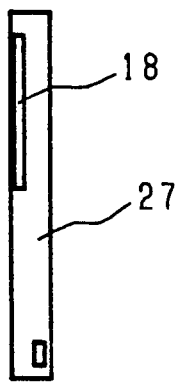
Figure 6C:
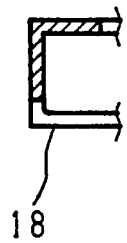
Figure 15:
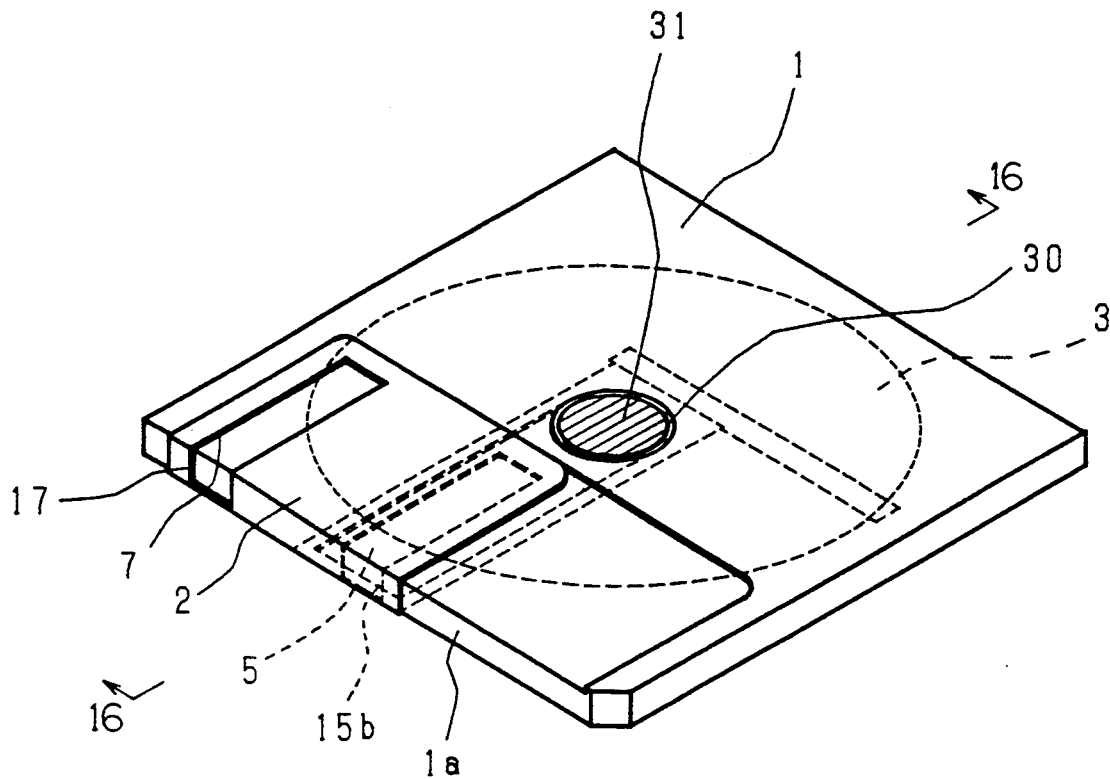
FIG. 15 is a perspective view of an optical disc cartridge of a second invention.
Figure 16:
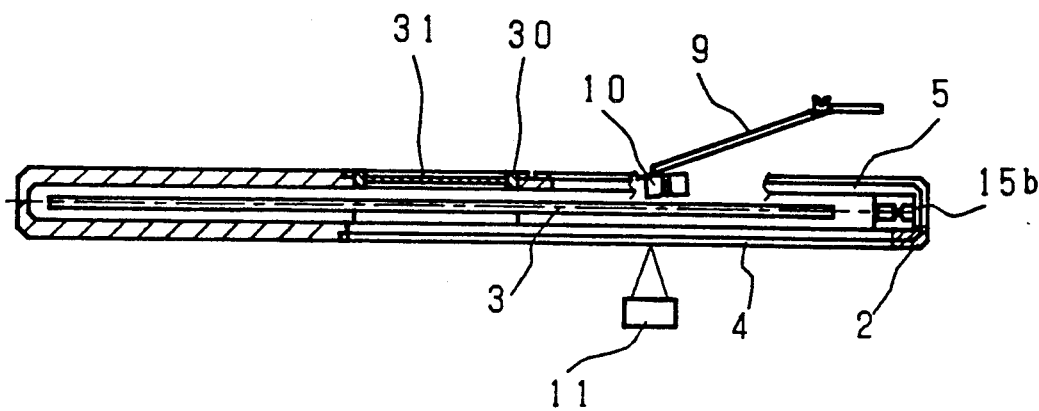
FIG. 16 is a sectional view of an optical disc cartridge cut off through XVI—XVI line shown in FIG. 15.
Figure 17:
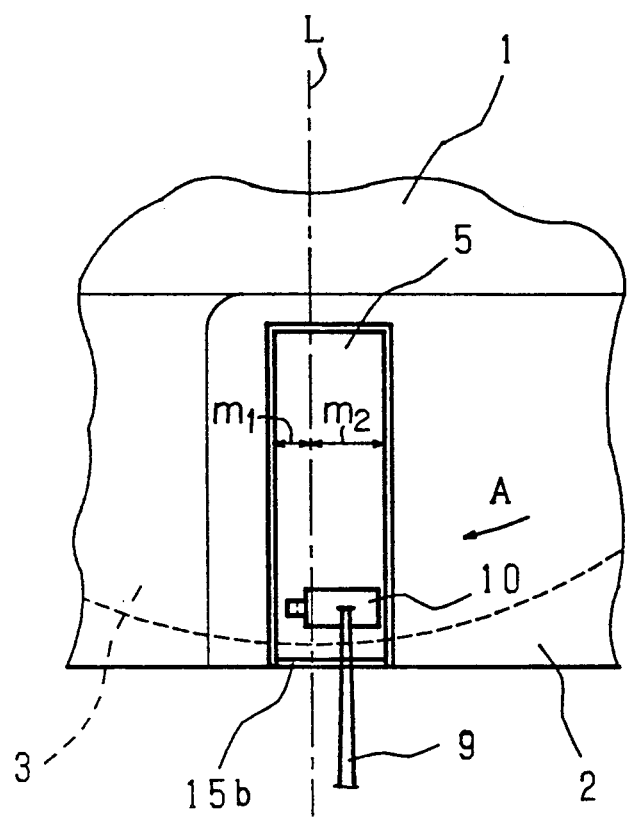
FIG. 17 is an enlarged plan view showing a shape of a second opening.

Next, the second embodiment of the present invention will be explained. FIG. 15 is a perspective view showing a construction of an optical disc cartridge related to the second invention, and FIG. 16 is a sectional view of the optical disc cartridge cut off through the XVI—XVI line in FIG. 1. In the figures, reference numeral 1 indicates a plastic case of an optical disc cartridge wherein a magneto optical disc 3 is housed. The case is shaped like a flat board being hollow inside with a thickness of several mm, and a rectangular first opening 4 including a center hole 8 is formed at one surface. The first opening 4 is for an optical head 11 to access, and the width and length thereof are those which are enough for the optical head 11 to access the magneto optical disc 3. FIG. 17 is an enlarged plan view showing the shape of a second opening when the shutter is positioned at the opening. At the other surface of the case 1 is formed the second opening 5 for the magnetic head 10 having a smaller width than that of the first opening 4. The second opening 5 is joined with a notch 15b which is a cut off portion of an end surface of the case 1, being opened with a length which is enough for a magnetic head 10 to access the inmost track of the magneto optical disc 3 in the vicinity of the center position at the other surface. The width of the second opening 5 is determined so that the slider-type magnetic head 10 which is set up on an arm 9 shown in FIG. 17 can access all the track of the magneto optical disc at the position where the magnetic head 10 faces an optical head 11. Furthermore, the second opening 5 is formed asymmetrically in width to the dimensional center line L—L of the case 1, and the relationship between the distance $m_2$ from an end portion of upstream side of the magneto optical disc 3 in the rotational direction shown as an arrow "A" to the center line L—L and the distance $m_1$ from an end portion of downstream side to the center line L—L is $m_1 < m_2$.

At the surface of the second opening 5 side of the case 1, a round shape air intake 30 is formed with the rotational center of the magneto optical disc 3 as the center position, the air intake 30 being provided with a filter 31 having numerous meshes of about 0.5 μm.

On the other hand, a shutter 2 of stainless steel thin board, which closes both the openings 4 and 5 of the case 1 when an optical disc cartridge is taken out of the disc driving unit, is set up at one end 1a of the case 1 so that it, having a section of U-shape, has both faces of the case therebetween. The shutter 2 is installed so that it move freely between a position for closing both openings 4 and 5 and a position for opening them. It is usually energized at a position for closing by means of a spring (not shown). At the shutter 2, an aperture 7 coordinating with the second opening 5 of the case 1 when the shutter 2 is at the position for opening, being the same shape as the opening 5, and having a notch 17, is formed.

Figure 18:
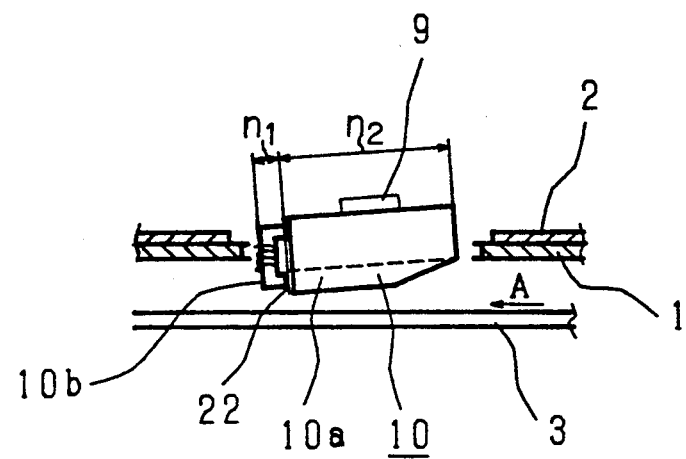
FIG. 18 is a side view showing the relationship between a magnetic head and a magneto optical disc.

FIG. 18 is a side sectional view showing the relationship between a magnetic head and a magneto optical disc. The magnetic head 10 is comprised of a slider portion 10a which rises by dynamic pressure caused by rotation of the magneto optical disc 3, and a head portion 10b which is approximate C-shape with the upper end thereof being fixed to the slider portion 10a, having a predetermined gap 22 between a lower end thereof and the slider portion 10a. By coinciding the center position of the gap 22 on the center line L—L shown in FIG. 17, the spot position of the optical head 11 corresponds to the center position of the gap 22. The relationship between the distance $m_1$ and the distance $m_2$ must be determined in proportion to the distance $n_1$ from the center position of the gap 22 to the end portion of the head portion 10b, and the distance $n_2$ from the center position of the gap 22 to the end portion of the slider portion 10a.

Figure 19:
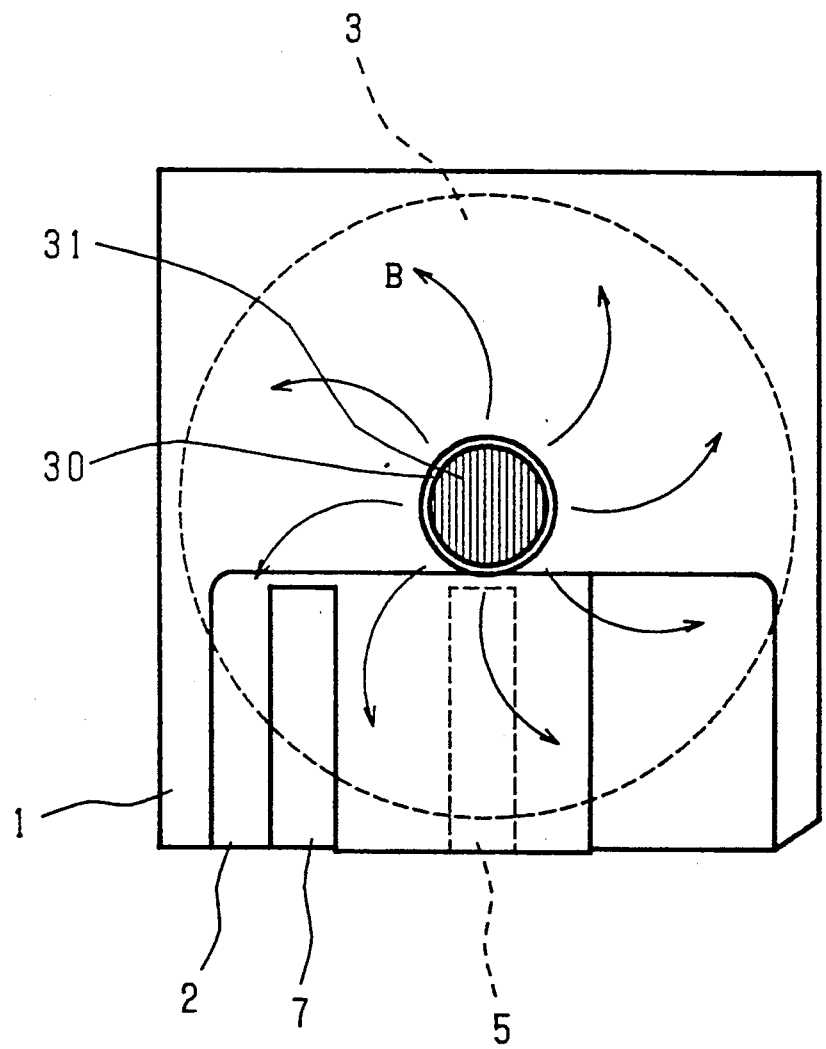
FIG. 19 is a plan view of an optical disc cartridge showing air flow taken in a case.

Next, explanation will be given on its operation. FIG. 19 is a plan view of an optical disc cartridge, showing air flow taken into the case. Air taken in from the air intake 30 has dust removed by a filter 31, cleansed and then supplied onto the magneto optical disc 3. The supplied air proceeds from the center to the periphery by means of the rotation of the magneto optical disc 3, and is diffused uniformly as shown by an arrow "B", forming stabilized air flow. By means of dynamic pressure, the magnetic head 10 rises keeping the gap between the magneto optical disc 3 and itself constant. When an optical disc cartridge is set in the disc driving unit (not shown), the shutter 2 is moved from the position for closing to the position for opening, and the notch 17 of the shutter 2 coordinates with the second opening 5 of the case 1. The magnetic head 10 is arranged on the magneto optical disc 3 without getting over the end surface of the case 1 since the notch 15b of the case is opened.

Furthermore, in this embodiment, although the air intake is a circle in shape, and the center position thereof is the rotational center of the magneto optical disc, this invention is not limited to this embodiment. The air intake may not be a circle in shape, and the center position may not coincide with the rotation center.

As described heretofore, according to the second invention, it is possible to supply clean air from the center of the magneto optical disc to its periphery, and to make the air flow uniform and stabilized.

Furthermore, the shutter is made of stainless steel in the inventions described above, however the material of the shutter may not only be stainless steel but instead a synthetic resin.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended in be embraced by the claims.

What is claimed is:

1. An optical disc cartridge comprising:
   a case having first and second sides and an end wall, a first opening formed in said first side for exposing a first surface of said disc, a second opening formed in said second side, said second side opposite said first side, for exposing a second surface of said disc, a notch formed in said end wall and contiguous with said second opening, and a groove formed in said end wall and extending laterally along said end wall, and
   a shutter disposed around the end wall of said case, said shutter adapted to move freely from a position for closing said first and second openings to a position for opening said first and second openings, and having means defining a notch which is in alignment with said second opening when said shutter is at said position for opening, and having a bent portion in alignment with and forming in part said notch in the shutter and engaging with the groove formed in the end wall of said case.

2. An optical disc cartridge as set forth in claim 1, wherein said bent portion of said shutter engages with said notch of said case.

3. An optical disk cartridge as set forth in claim 1, further comprising an air passage disposed in said case through which air passes when the disc is in operation, and a filter covering said passage for removing dust in the air.

4. An optical disc cartridge comprising:
   a case having first and second sides and an end wall, for surrounding an optical disc, a first opening formed in said first side for exposing a first surface of said disc, a second opening formed in said second side, said second side opposite said first side, for exposing a second surface of said disc,
   a shutter disposed to surround the end wall of said case, said shutter adapted to move freely from a position for closing said first and second openings to a position for opening said first and second openings, and
   means defining an air passage in one of said sides of said case through which air passes when the disc is in operation, and a filter covering said passage for removing dust in the air.

5. An optical disc cartridge as set forth in claim 4 wherein said air passage is disposed substantially in the center of said case.

6. An optical disc cartridge as set forth in claim 5 wherein said air passage opening is circular in shape.

7. An optical disc cartridge comprising:
   a case defining a chamber for housing said optical disc, said case having top and bottom walls and an end wall, means defining a first opening formed in the bottom wall, means defining a second opening formed in the top wall, means defining a notch formed in said end wall and contiguous with said second opening, and means defining a groove extending laterally along said end wall, and
   a shutter having opposite sides that cooperate with said top and bottom walls of the case and movable from a position for closing said both openings to a position for opening said both openings, said shutter having end wall and means defining a notch in the end wall, said notch in alignment with said case notch when the shutter is in its open position, and said shutter having a bent portion engaging with the groove in the end wall of said case and in alignment with said notch in said shutter.

8. An optical disc cartridge as set forth in claim 7, wherein said bent portion of said shutter engages with said notch of said case.

9. An optical disc cartridge as set forth in claim 8 wherein one of said top and bottom walls has a passage disposed therein through which air passes, and a filter covering said passage.

* * * * *